United States Patent
Allebach et al.

(10) Patent No.: US 6,200,543 B1
(45) Date of Patent: Mar. 13, 2001

(54) APPARATUS AND METHODS FOR REDUCING CARBON DIOXIDE CONTENT OF AN AIR STREAM

(75) Inventors: William S. Allebach, Ste. Genevieve; Gary F. Lutman, Bloomsdale; Mark G. DeGenova, Ste. Genevieve; Randy J. Griffard, St. Mary, all of MO (US)

(73) Assignee: Mississippi Lime Company, Ste. Genevieve, MO (US)

( * ) Notice: Subject to any disclaimer, the term of this patent is extended or adjusted under 35 U.S.C. 154(b) by 0 days.

(21) Appl. No.: 09/031,320

(22) Filed: Feb. 25, 1998

(51) Int. Cl.⁷ .................................................. B01D 53/00
(52) U.S. Cl. ........................... 423/220; 423/230; 95/273; 95/285
(58) Field of Search .................................. 423/220, 230; 95/273, 285

(56) References Cited

U.S. PATENT DOCUMENTS

| | | | |
|---|---|---|---|
| 2,332,887 | * 10/1943 | Biederbeck et al. | 423/230 |
| 3,847,837 | * 11/1974 | Boryta | 252/468 |
| 4,559,211 | * 12/1985 | Feldman et al. | 423/242 |
| 5,227,144 | * 7/1993 | Perez de la Garza | 423/210 |
| 5,678,959 | 10/1997 | Griffard et al. | 406/137 |

OTHER PUBLICATIONS

Perry et al. (editors) *Chemical Engineers' Handbook*, 5th Edition McGraw–Hill Book Co. USA; ISBN 0-07-049478-9, pp. 20-89 to 20-94, 1973.*
Lime—Handling, Application and Storage, National Lime Association 1995, No. 213, Chapter 2, pp. 9-26.

* cited by examiner

*Primary Examiner*—Steven P. Griffin
*Assistant Examiner*—Timothy C. Vanoy
(74) *Attorney, Agent, or Firm*—Armstrong Teasdale LLP

(57) ABSTRACT

Apparatus and methods for reducing $CO_2$ content of an air stream are described. A method of reducing $CO_2$ content of an air stream in accordance with one embodiment of the present invention includes the steps of first injecting hydrated lime into an air stream containing $CO_2$. The hydrated lime reacts with the $CO_2$ in the air stream to form calcium carbonate, $CaCO_3$. The air stream is then directed into a lime storage container having a dust collector. As air is drawn through the dust collector, hydrated lime and $CaCO_3$ are collected on the filter bags. The air drawn through the dust collector has a reduced $CO_2$ content as compared to the air prior to being injected with hydrated lime. The reduced $CO_2$ content air stream exhausted from the dust collector can then be directed to the different parts of the hydrated lime manufacturing process, such as the milling process, conveying and storing the hydrated lime.

10 Claims, 1 Drawing Sheet

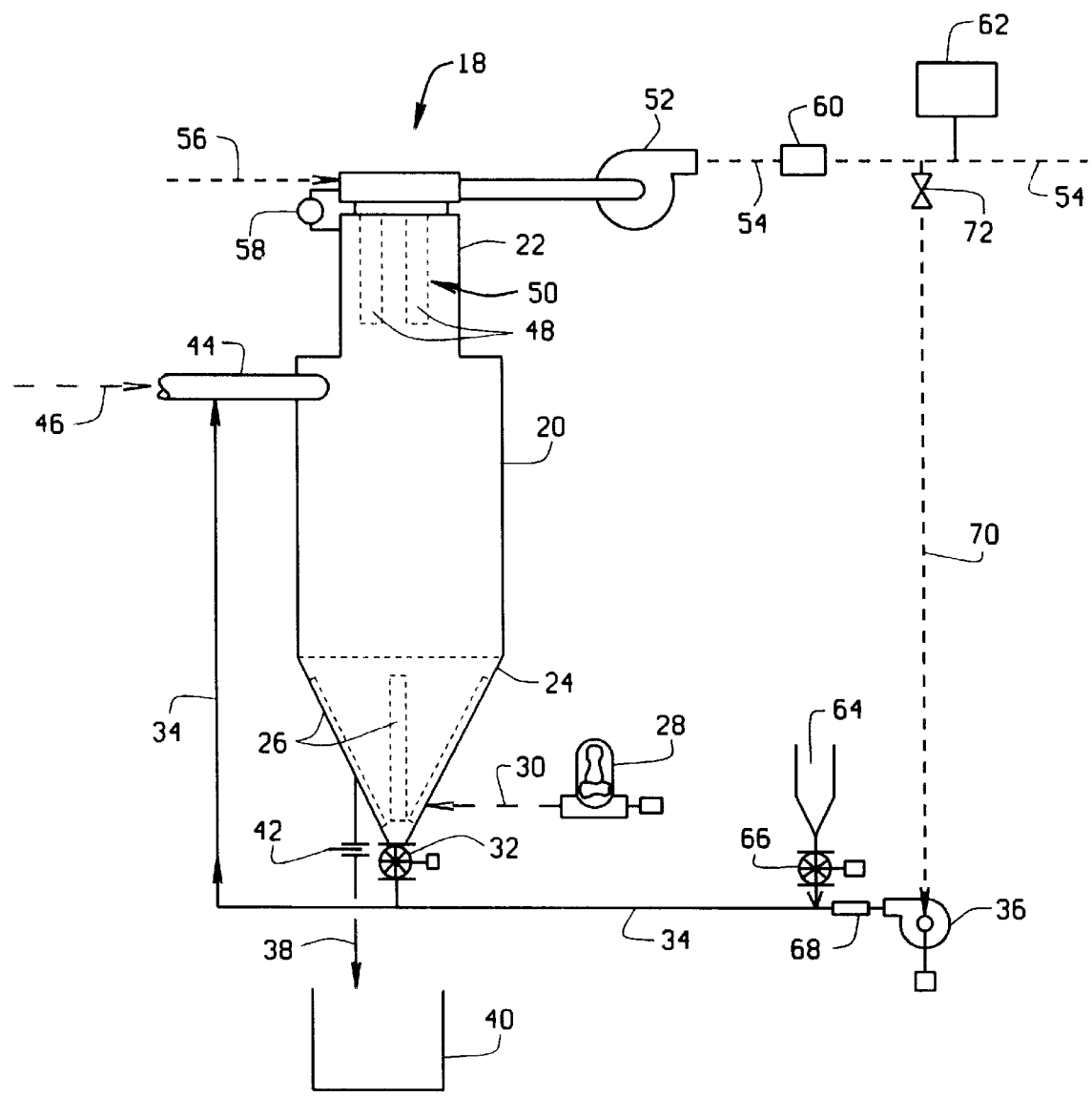

APPARATUS AND METHODS FOR REDUCING CARBON DIOXIDE CONTENT OF AN AIR STREAM

FIELD OF THE INVENTION

This invention relates generally to reducing the carbon dioxide ($CO_2$) content of an air stream and more particularly, to apparatus and methods for reducing the $CO_2$ content of an air stream used in the manufacture of hydrated lime.

BACKGROUND OF THE INVENTION

During the manufacture, conveyance, and storage of calcium hydroxide, $Ca(OH)_2$, sometimes referred to as hydrated lime, the presence of $CO_2$ in the air which comes in contact with the hydrated lime can compromise the chemical integrity of the hydrated lime. While hydrated lime has a greater moisture stability than calcium oxide, hydrated lime is perishable unless adequately protected from $CO_2$ absorption. Hydrated lime has a strong affinity for $CO_2$ even in dilute concentrations. When hydrated lime absorbs $CO_2$ from the air, an undesirable reaction known as recarbonation occurs and the $Ca(OH)_2$ is converted to calcium carbonate, $CaCO_3$. It is known that $CaCO_3$ can deposit as scale on the walls of conduits in pneumatic conveying systems. As these deposits build up, they can sometimes totally occlude the conduit.

Hydrated lime in storage containers can absorb $CO_2$ from the air in the storage container. Also, as hydrated lime is milled into smaller particles during manufacturing, the hydrated lime becomes more susceptible to $CO_2$ absorption. This is because as the lime is milled into smaller particles, the surface area per unit volume of lime increases. The increased surface area per unit volume will increase the $CO_2$ absorption rate of the lime making it susceptible to chemical degradation.

The chemical integrity of hydrated lime can be protected using an inert gas such as nitrogen for blanketing storage containers, milling machines, and conveying systems. However, commercial generators of nitrogen are expensive to install and maintain.

It would be desirable to provide inexpensive, easy to maintain apparatus and methods that provide air with a reduced $CO_2$ content. The reduced $CO_2$ content air could then be used in manufacturing, conveying and storing hydrated lime such that the chemical integrity of the hydrated lime is not degraded.

SUMMARY OF THE INVENTION

These and other objects may be attained by apparatus and methods for generating a reduced $CO_2$ content air stream by injecting hydrated lime into an air stream. The lime reacts with the $CO_2$ in the air stream to form calcium carbonate, $CaCO_3$. As a result of this reaction, the $CO_2$ content of the air stream is reduced. The reduced $CO_2$ content air stream can then be used, for example, in a hydrated lime manufacturing process. Particularly, the reduced $CO_2$ content air may be used to blanket storage containers, milling machines, and conveying systems. The reduced $CO_2$ content air also may be used in pneumatic conveying systems.

More specifically, a method for reducing $CO_2$ content of an air stream in accordance with one embodiment of the present invention includes the steps of injecting hydrated lime into an air stream containing $CO_2$. The hydrated lime reacts with the $CO_2$ in the air stream to form $CaCO_3$. The air stream is then directed into a lime storage container having a dust collector. As air is drawn through the dust collector, hydrated lime and $CaCO_3$ are collected on the filter bags. The air drawn through the dust collector has a reduced $CO_2$ content as compared to the air prior to being injected with hydrated lime. The reduced $CO_2$ content air stream exhausted from the dust collector can then be directed to the different parts of the hydrated lime manufacturing process.

An apparatus for reducing $CO_2$ content of an air stream in accordance with one embodiment of the present invention includes a lime storage container, and an air and lime inlet conduit connected to an inlet of the lime storage container. A dust collector is attached to and in flow communication with the storage container, and a dust collector exhaust fan is connected to, and in flow communication with, the dust collector by an exhaust air line.

A rotary airlock valve with a variable speed drive, for dispensing hydrated lime from the storage container, is located at an outlet of the storage container and connected to a hydrated lime feed line. The feed line extends from a blower to the air and lime inlet conduit. The blower supplies air to pneumatically convey hydrated lime through the feed line to the air and lime inlet conduit where the lime is injected into the air stream.

Prior to the operation, the lime storage container is at least partially filled with hydrated lime. In operation, lime from the storage container flows through the rotary airlock valve into the lime feed line. The lime in the lime feed line is pneumatically conveyed, e.g., by air from the blower, to the air and lime inlet conduit and is injected into a $CO_2$ containing air stream flowing in the inlet conduit. The hydrated lime reacts with $CO_2$ in the air stream to form $CaCO_3$, which reduces the $CO_2$ content of the air stream as it is directed into the storage container.

Air inside the storage container is drawn into and through the attached dust collector by a dust collector blower. Hydrated lime and $CaCO_3$ are collected in the dust collector as the reduced $CO_2$ content air is exhausted from the dust collector. The reduced $CO_2$ content air exhausted from the dust collector can then be directed to different hydrated lime manufacturing processes, such as the milling process, and may be used in conveying and storing the hydrated lime.

As mentioned above, the reduced $CO_2$ content air can be utilized to reduce the amount of $CaCO_3$ formed while processing and storing hydrated lime. As a result, very little scaling of conduits will occur and the chemical integrity of the hydrated lime is maintained.

BRIEF DESCRIPTION OF THE DRAWING

The drawing is a schematic diagram of one embodiment of an apparatus for reducing the $CO_2$ content of an air stream.

DETAILED DESCRIPTION

The drawing is a schematic diagram of an embodiment of an apparatus 18 for reducing $CO_2$ content of an air stream. Apparatus 18 includes a hydrated lime storage container 20. A dust collector 22 is mounted to an upper end of container 20 and container 20 has a tapered or conical shaped bottom portion 24. Several air pads 26 are located in container bottom portion 24 for maintaining fluidity of the hydrated lime stored in container 20. Air pads 26 are connected to an aeration blower 28 by an air line 30. A variable speed rotary airlock 32 is mounted at an outlet located at the bottom of storage container 20 to meter hydrated lime from storage container 20 into a hydrated lime feed line 34. Hydrated lime feed line 34 is connected at one end to blower 36 and at the other end to an air and lime inlet conduit 44. Specifically, the hydrated lime from storage container 20 is mixed with air supplied by blower 36 for pneumatically conveying hydrated lime through feed line 34 to air and lime inlet conduit 44. Rotary airlock valve 32 may, for example, be a rotary airlock driven by a variable speed gear motor, having adjustable tips, hard chrome internals and a vented shear hopper. Such airlock valves are commercially available from Rotolock Valves Inc., Monroe, N.C.

A disposal conduit or dump line 38 is connected to, and extends from an outlet of, storage container 20 so that the contents of container 20 can be transferred into a disposal container 40. Disposal container 40 may be any suitable container including, but not limited to, a tote container, a truck or a railcar. A slide gate valve 42 is provided in conduit 38 to control the flow from container 20 to disposal container 40.

Air and lime inlet conduit 44 is connected to an inlet of storage container 20. Air stream 46 is introduced into storage container 20 through inlet conduit 44. As described below in more detail, hydrated lime from feed line 34 is injected into $CO_2$ containing air stream 46 inside inlet conduit 44.

Dust collector 22 may be a commercially available model of dust collector such as, for example, the Amerex RV-8-24 ARR2 dust collector available from Amerex Inc., Woodstock, Ga. Collector 22 has a plurality of filter bags 48 (two shown). The outer surface of filter bags 48 form a dust collecting surface 50. A dust collector exhaust fan 52 is connected to, and is in flow communication with, dust collector 22 through exhaust line or conduit 54. Fan 52 draws air through and exhausts air from dust collector 22 and into exhaust line or conduit 54.

To clean or purge dust collecting surface 50 of filter bags 48, compressed air is pulsed from air line 56 through the bags. The air from air line 56 flows in the opposite direction from the air exhausted from dust collector 22. The air flows from air line 56 through filter bags 48 and into storage container 20. A pressure differential switch 58 is attached to and in communication with dust collector 22. Switch 58 measures the pressure differential across surface 50 and when the pressure differential reaches a predetermined value, switch 58 activates the compressed air purge. Examples of commercially available pressure differential switches which could be used as switch 58 include the Series 3000 PHOTOHELIC Switch/Gauges, the Series 4300 CAPSU-PHOTOHELIC Switch/Gauges, the Series 1900 Differential Pressure Switches, and the Series PG Differential Pressure Switches, all available from Dwyer Instruments, Inc., Michigan City, Ind.

A broken bag detector 60 is attached to exhaust conduit 54 to monitor the exhaust air for particles of hydrated lime which would indicate that a filter bag 48 had torn and was allowing hydrated lime particles to exhaust through dust collector 22. Broken bag detector 60 may be a commercially available model of broken bag detector such as, for example, the TRIBOGUARD I Dust Detector available from Auburn International, Inc., Danvers, Mass. Also, a $CO_2$ tester 62 is attached to exhaust conduit 54 to measure the amount of $CO_2$ contained in the air stream exhausted from dust collector 22 to ensure sufficient $CO_2$ reduction is being achieved. $CO_2$ tester 62 may be any commercially available model of $CO_2$ analyzers such as, for example, the XENDOS 2500 Process Analyzer available from Servomex, Inc.

A rotary airlock valve 66 is secured at an outlet of a lime feed hopper 64 to meter hydrated lime into lime feed line 34. Feed hopper 64 may be a bag or a bulk bag feed hopper. Air from blower 36 is used to pneumatically convey hydrated lime metered from feed hopper 64 through feed line 34. To reduce operational noise, a muffler 68 may be positioned in feed line 34 between blower 36 and airlock valve 66. Air line 70 connects blower 36 to exhaust conduit 54 through valve 72. If reduced $CO_2$ content air is desired for pneumatically conveying hydrated lime through feed line 34, valve 72 is opened and reduced $CO_2$ content air is supplied to blower 36 from exhaust conduit 54.

Prior to, and possibly even during operation, storage container 20 is at least partially filled with hydrated lime from feed hopper 64. Particularly, rotary airlock 64 meters hydrated lime from hopper 64 into feed line 34. Blower 36 is operated to blow air through line 34 to pneumatically convey lime through feed line 34. The lime flows into lime and air inlet conduit 44 and then into storage container 20. Storage container 20 may alternately be filled using a conduit (not shown) connected at one end to a pneumatic self-unloading vehicle (not shown), such as a truck or rail car. The other end of the conduit may be connected to inlet conduit 44 for unloading hydrated lime from the self-unloading vehicle into storage container 20. Also, a sealable hatch (not shown) in storage container 20 may also be used for manual filling of storage container 20 with hydrated lime.

To reduce the $CO_2$ content of air, and in operation, hydrated lime in storage container 20 is metered from storage container 20 by rotary airlock 32 and then pneumatically conveyed through feed line 34 into air and lime inlet conduit 44. The hydrated lime is injected into $CO_2$ containing air stream 46 flowing inside inlet conduit 44. After the hydrated lime is injected into air stream 46, the $CO_2$ in air stream 46 starts reacting with the hydrated lime to form $CaCO_3$. Because a portion of the $CO_2$ in air stream 46 reacts with the hydrated lime, the $CO_2$ content in air stream 46 is reduced. Air stream 46, containing particles of hydrated lime and $CaCO_3$, is then directed into storage container 20. Some of the hydrated lime and $CaCO_3$ particles fall towards the bottom of storage container 20, and some of such particles are drawn into dust collector 22 by blower 52. In any event, air in container 20 is drawn through dust collector 22. In dust collector 22, hydrated lime and $CaCO_3$ particles are collected on filter bags 48. Specifically, any unreacted hydrated lime and $CaCO_3$ is collected on filter bags 48.

When the layer of collected hydrated lime and $CaCO_3$ on dust collecting surface 50 becomes too thick, air flow through filter bags 48 becomes restricted. A pressure differential may be measured across surface 50, typically with a magnehelic gauge. Pressure differential switch 58 measures the pressure differential across surface 50 and when the pressure drop reaches a predetermined value, switch 58 activates a purge cycle. The purge cycle includes directing a blast of compressed air from air line 56 into the center of filter bags 48 which causes a shock wave to pneumatically and mechanically remove the built up lime and $CaCO_3$ from surface 50.

In another embodiment, filter bags 48 are purged at predetermined intervals of time. Instead of including pressure differential switch 58, apparatus 18 would include an interval timer which would activate the purge cycle at predetermined intervals. Suitable timers for use may include, for example, AMEREX Standard 1–4 Position Sequence Timer commercially available from Amerex, Inc., Woodstock, Ga.

In still other embodiments, filter bags 48 may be purged by methods other than a compressed air blast. For example, a mechanical shaker may be activated by switch 58 or an interval timer to shake filter bags 48 causing the deposited lime and $CaCO_3$ to fall from surface 50. Another method includes passing a continuous stream of air through filter bags 48 in a reverse flow. The reverse flow air causes the lime and $CaCO_3$ to fall off surface 50.

The hydrated lime and $CaCO_3$ that is purged from filter bags 48 falls back into storage container 20 to be reused and reinjected into $CO_2$ containing air stream 46, thus maximizing the usage of the hydrated lime and minimizing waste.

The above described system may generally be referred to as a closed loop system. Particularly, hydrated lime in storage container 20 is metered into feed line 34 and conveyed to and injected into $CO_2$ containing air stream 46 in inlet conduit 44. The hydrated lime is then collected on filter bags 48 in dust collector 22. When filter bags 48 are purged, the hydrated lime falls into the lime in the lower portion of storage container 20, and may once again be metered into feed line 34.

The air in exhaust line 54 has a reduced $CO_2$ content and may be directed to other parts of the hydrated lime manufacturing process for use in, for example, the milling process, conveying and/or storing hydrated lime. Broken bag detector 60 attached to exhaust conduit 54 monitors the exhaust air for particles of hydrated lime which would indicate that a filter bag 48 had torn and was allowing hydrated lime particles to exhaust through dust collector 22. If such a situation occurs, operation should be paused or suspended and the torn filter bag 48 should be replaced with a different fully functional filter bag 48.

$CO_2$ tester 62 measures $CO_2$ content of the exhaust air in exhaust line 54. Output from tester 62 may be used to control the speed of rotary airlock 32. For example, if tester 62 detects that the $CO_2$ content of the exhausted air has undesirably increased, airlock 32 can be controlled to increase speed and thus increase the lime feed rate and add more material to air stream 46. An increased feed rate may be needed because as hydrated lime is converted to $CaCO_3$, the percentage of hydrated lime in storage container 20 decreases and thus the $CO_2$ adsorbing capacity of the lime injected into air stream 46 decreases. When rotary airlock 32 reaches maximum speed and the $CO_2$ level increases above a predetermined value, apparatus 18 is shut down and the spent lime, i.e., $CaCO_3$, is emptied from storage container 20 through disposal conduit 38 into disposal container 40. Storage container 20 is then refilled with hydrated lime with the use of feed hopper 64. Rotary airlock 64 meters virgin lime from hopper 64 for pneumatic conveying through feed line 34 into inlet 44 and then into storage container 20. During the refilling process rotary airlock 32 is turned off so that no hydrated lime is discharged from storage container 20. Because virgin hydrated lime is entering storage container 20 through air and lime inlet 44, air stream 46 may be continuously processed to reduce $CO_2$ content during the refilling step. The alternative ways of filling storage container 20 described above may also be used to refill container 20. However, continuous processing of $CO_2$ containing air cannot be accomplished during refilling when using the alternative refilling methods.

The size of the components of apparatus 18 and the feed rate of hydrated lime needed to treat a $CO_2$ containing air stream may be easily calculated. Typically air has a $CO_2$ content of 0.033% by volume or 0.05% by weight. One cubic foot of air weighs 0.075 pounds and contains 0.0000375 pounds of $CO_2$. For example, to remove the $CO_2$ from 2000 cubic feet per minute of air would require the removal of 0.075 pounds of $CO_2$ per minute or 4.7 pounds per hour. Stoichiometrically, approximately 1.7 pounds of hydrated lime, as $Ca(OH)_2$, is needed to chemically absorb one pound of $CO_2$, therefore, approximately 8 pounds per hour of hydrated lime is needed. At elevated levels of $CO_2$ content or for higher volumes of air, higher feed rates of hydrated lime would be needed, and be similarly calculated.

In an alternate embodiment, air and lime inlet conduit 44 is directly connected to dust collector 22 at an inlet of dust collector 22. In another embodiment, feed hopper 64 may be connected to a separate lime feed line for filling or refilling storage container 20. Feed hopper 64 may also be connected to a separate blower for conveying lime to container 20.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method of reducing $CO_2$ content of an air stream, said method comprising the steps of:
   (a) injecting hydrated lime into an air stream containing $CO_2$ so that the hydrated lime reacts with the $CO_2$ in the air stream to form $CaCO_3$;
   (b) directing the air stream, the injected hydrated lime, and formed $CaCO_3$ through an inlet conduit and into a lime storage container having a dust collector;
   (c) collecting hydrated lime and $CaCO_3$ on the dust collector; and
   (d) exhausting air from the dust collector.

2. A method in accordance with claim 1 further comprising the step of at least partially purging the dust collector of collected hydrated lime and $CaCO_3$ and allowing the hydrated lime and $CaCO_3$ to fall into the storage container, and wherein injecting hydrated lime into an air stream containing $CO_2$ comprises the step of injecting hydrated lime from the storage container into the $CO_2$ containing air stream.

3. A method in accordance with claim 2 wherein the dust collector comprises a plurality of filter bags, each bag having an outer surface.

4. A method in accordance with claim 3 further comprising the step of measuring a pressure drop across the filter bag surface in the dust collector and when the measured pressure drop exceeds a predetermined value, performing the step of at least partially purging the filter bags of collected hydrated lime and $CaCO_3$.

5. A method in accordance with claim 2 further comprising the step of measuring the $CO_2$ content of the air stream exhausted from the dust collector and when the measured $CO_2$ content is above a predetermined value removing the $CaCO_3$ and any hydrated lime from the storage container and then refilling the storage container to a predetermined level with virgin hydrated lime.

6. A method of reducing $CO_2$ content of an air stream, said method comprising the steps of:
   filling a lime storage container having a dust collector with hydrated lime to a predetermined level;
   injecting hydrated lime metered from the storage container into an air stream containing $CO_2$ so that the hydrated lime reacts with $CO_2$ in the air stream forming $CaCO_3$ and reducing the $CO_2$ content of the air stream, the air stream located outside of the lime storage container;

directing the air stream, injected hydrated lime, and formed $CaCO_3$ through an inlet conduit and into the lime storage container;

collecting hydrated lime and $CaCO_3$ in the dust collector; and exhausting air with reduced $CO_2$ content from the dust collector.

7. A method in accordance with claim 6 further comprising the step of at least partially purging the dust collector of collected hydrated lime and $CaCO_3$ and allowing the hydrated lime and $CaCO_3$ to fall into the storage container, and wherein injecting hydrated lime into an air stream containing $CO_2$ comprises the step of injecting the collected hydrated lime in the storage container into the $CO_2$ containing air stream.

8. A method in accordance with claim 7 wherein the dust collector comprises a plurality of filter bags, each bag having an outer surface.

9. A method in accordance with claim 8 further comprising the step of measuring a pressure drop across the filter bag surface in the dust collector and when the measured pressure drop exceeds a predetermined value, performing the step of at least partially purging the filter bags of collected hydrated lime and $CaCO_3$.

10. A method in accordance with claim 7 further comprising the step of measuring the $CO_2$ content of the air stream exhausted from the dust collector and when the measured $CO_2$ content is above a predetermined value removing the $CaCO_3$ and any hydrated lime from the storage container and then refilling the storage container to a predetermined level with virgin hydrated lime.

* * * * *